United States Patent Office 3,721,735
Patented Mar. 20, 1973

3,721,735
COMPOSITIONS FOR AND METHOD OF LOWERING CHOLESTEROL LEVELS
Charles A. Thiffault, 3078 Avenue de la Promenade, Ste. Foy, Quebec, Canada
No Drawing. Filed July 15, 1970, Ser. No. 55,254
Int. Cl. A61k 27/00
U.S. Cl. 424—195                    2 Claims

ABSTRACT OF THE DISCLOSURE

There is disclosed a method for lowering the cholesterol levels of humans suffering from hyperlipidemia and associated conditions comprising the administering thereto of effective doses of lignin. Suitable pharmaceutical compositions of lignin are also disclosed.

BACKGROUND OF THE INVENTION

This invention relates to new pharmaceutical compositions and to methods for using same for reducing levels of cholesterol in the blood of humans suffering from hyperlipidemia and associated conditions.

Strong evidence exists that hyperlipidemia is associated with atherosclerosis. The term hyperlipidemia implies an excess of plasma lipids which includes free and esterified cholesterol, triglycerides and phospholipids, and includes the clinical term hypercholesteremia designating abnormally high levels of blood cholesterol. In seeking effective ways to treat hyperlipidemia, numerous investigations have been directed to agents and methods to lower elevated cholesterol levels. This focusing of attention on cholesterol levels is due mainly to evidence relating serum cholesterol to coronary artery disease. Also, cholesterol has been shown to be major constituent of the atherosclerotic lesion both in man and animals.

During the last few decades a large number of compounds have been tested as hypocholesteremic agents in man. Despite the intensive research in this area, relatively few of these compounds have been found acceptable for long-term therapy and even these have drawbacks, see D. Kritchevsky, Ann. N.Y. Acad. Sci., 149, Art. 2, 1058 (1968).

The present invention discloses a method and new pharmaceutical compositions for reducing levels of blood cholesterol substantially free of the side effects associated with present day therapy.

SUMMARY OF THE INVENTION

According to the present invention, lignin is administered orally to humans at doses effective for reducing the levels of plasma lipids, especially of cholesterol, in the blood.

DETAILED DESCRIPTION OF THE INVENTION

Lignin, a high molecular weight polymer, is an abundant constituent of the tissue of plants, especially trees. It is a major by-product of the pulp and paper industry. Although lignin is a mixture of structurally closely related compounds it is generally treated as a single compound in most publications, mainly because this mixture cannot be separated by practical means. Furthermore, it is known that variations occur in the chemical composition of lignin due to the difference of the ratio of the related compounds. This variation depends on the species of plant from which the lignin has been obtained and also depends upon the conditions used to extract the lignin from the plant. These variations are not considered to be critical to the present invention.

In the particular embodiment of the invention described herein, lignin refers to that substance often described as "alkali soluble lignin." Alkali soluble lignin is obtained from the alkaline processes for preparation of wood pulp and is available commercially. Such lignin is usually characterized by a pH ranging from 5.0 to 7.5, a methoxyl content ranging from 12 to 17%, and a sulfur content ranging from 1 to 5%.

When the therapeutic ingredient of the invention, lignin, is used to reduce cholesterol, it may be orally administered alone, for example, in capsules or mixed with a preferred beverage, for example water, milk or a fruit juice or preferred food, for example, soups or a pulpy fruit. The active ingredient of this invention may also be associated with or added to known pharmaceutical excipients and incorporated by known means into pharmaceutical compositions. Suitable pharmaceutical compositions include suspensions or syrups, in which the active ingredient ordinarily constitutes 67 to 99.5%, by weight of the composition associated with a pharmaceutically acceptable suspending, thickening or dispersing agent. Suitable suspending, thickening or dispersing agents are described in "Remington's Practice of Pharmacy," E. W. Martin et al., Ed., Mack Publishing Co., Easton, Pa., 1961, and include water soluble gums, pectin, sodium alginate, methyl cellulose and other pharmaceutically acceptable hydrocolloids. For example, methyl cellulose may be associated with or added to the lignin in proportions ranging from 0.5 percent to about 33 percent on a weight/weight basis to effect a more uniform dispersion of the lignin in the gastrointestinal tract.

An example of a suitable therapeutic composition for the active ingredient of this invention may be prepared by mixing in a mechanical blender 99.5 g. of lignin, for instance one of the Indulin products produced by West Virginia Pulp and Paper, with 0.5 g. of methyl cellulose. Other pharmaceutically acceptable hydrocolloids may be used in a similar manner. The resulting mixture is then placed in capsules in amounts of 1.0 g., 0.5 g. or 0.25 g. each to provide 100, 200 or 400 capsules, respectively containing 1.0, 0.5, or 0.25 g. each of the above mixture. The capsules may be administered directly or opened and the contents slurried or suspended in a suitable beverage or food.

Generally, treatment is initiated with small dosages substantially less than the optimum dose of the compound. Thereafter, the dosage is increased by small increments until the optimum effect under the circumstances is reached. In general, the therapeutic ingredient of this invention is most desirably administered at a concentration level that will generally afford effective results without causing any harmful or deleterious side effects and preferably at a level that is in a range of from about 0.5 to about 10 g. per day per patient. However, a dosage level that is in the range of from about 1.2 g. to about 4 g. per day per patient is most desirably employed in order to achieve effective results. These daily doses may be divided and given preferably before or during meals.

Prospective patients for treatment by the method of this invention are selected on the basis that their levels of blood cholesterol are abnormally high. The upper limit for normal blood cholesterol rises from 230 mg. per 100 ml. (230 mg. percent) in persons less than 20 years old to 330 mg. percent at age 50. Subsequent treatment of these patients by administering lignin in the dosages described above usually results in about a 20% reduction of the initial levels of blood cholesterol. In patients with very high levels even greater reductions are observed.

The effectiveness of lignin in reducing levels of plasma lipids, especially of blood cholesterol, may be demonstrated by administering the lignin to known hypercholesteremic patients and monitoring the results by measuring blood cholesterol levels at regular intervals according to the method of H. H. Leffler, Amer. J. Clin. Pathol., 31, 310 (1959).

More specifically, the effectiveness of the therapeutic ingredient of this invention may be demonstrated by a clinical pharmacology study in which the hypercholesteremic patient is used as his or her own control. In addition, a positive control consisting of administering to the patient a daily effective dose of the known hypocholesteremic agent, cholestyramine, for a period of four to five months for comparative purposes may also be used.

In one study using three patients, after a control period to establish a base line for pretreatment blood cholesterol levels, each patient is then treated with daily effective doses (12.0 g./day) of cholestyramine for a period of four or five months (positive control period). Following this treatment each patient is then given daily doses of the therapeutic ingredient of this invention within the dosage range specified above for at least three months (treatment period). By averaging the blood cholesterol values determined during each period, control, positive control and lignin treatment, it may be shown that the hypocholesteremic effect of cholestyramine is maintained by lignin at substantially lesser doses, about $\frac{1}{10}$ to $\frac{1}{4}$ of the dose of cholestyramine. The results of this study are illustrated in Table I:

TABLE I

| Patient | Age (years) | Blood cholesterol (mg. percent) | | |
|---|---|---|---|---|
| | | Control | Positive control (cholestyramine, 12 g./patient/day) | Treatment, lignin with 0.5% methyl cellulose, 2-4 g./patient/day |
| R.C. | 36 | 423 | 297±21 | 284±19 |
| P.H.D. | 30 | 375 | 293±15 | 303±17 |
| G.Mc. | 21 | 396 | 336±20 | 319±19 |

In the preceding study, the use of cholestyramine as a positive control for comparative purposes should not be interpreted to mean that cholestyramine administration is a prerequisite to demonstrate the effectiveness of the therapeutic ingredient of this invention. To amplify this point more profoundly, there is disclosed a second study conducted with three different hypercholesteremic patients in the same manner as the preceding study except that between the positive control period and the lignin treatment period about a two months rest period was allowed during which blood cholesterol levels returned to near the initial pretreatment control levels. Subsequent treatment with lignin then reduced levels of blood cholesterol to values comparable to those obtained during the positive control period. The results of this second study are illustrated in Table II.

TABLE II

| Patient | Age (years) | Blood cholesterol (mg. percent) | | |
|---|---|---|---|---|
| | | Control | Positive control (cholestyramine, 12 g./patient/day) | Treatment, lignin with 0.5% methyl cellulose, 2-4 g./patient/day |
| E.T. | 50 | 460 | 391±13 | 374±14 |
| N.V. | 47 | 458 | 355±20 | 389±20 |
| J.T. | 30 | 388 | 289±28 | 303±23 |

In the above studies side effects associated with cholestyramine such as diarrhea, constipation and nausea, were absent during treatment with lignin. It is also worth noting that lignin is much better tolerated than cholestyramine, mainly due to the absence odor and disagreeable taste.

The use of cholestyramine as a positive control in the above studies is not meant to imply that there is a similarity of mode of action between this agent and the active ingredient of this invention. In fact the vast differences in chemical properties of lignin and the anionic exchange resin, cholestyramine, indicated that different modes of actions may exist for these agents. In any event, the positive control is used only for comparison of hypocholesteremic effects. An explanation of the mode of action for the hypocholesteremic effect of the active ingredient of this invention is not intended to be an aspect of this invention.

Having described and illustrated a preferred embodiment of the present invention, it is appreciated that immaterial variation may be made without departing from the substance of the invention. Such variations are included within the scope of the invention.

I claim:

1. A method for reducing levels of cholesterol in the blood of humans suffering from hyperlipidemia which comprises administering orally to such humans in doses of from 0.5 to 10 grams per day of an admixture of lignin and methyl cellulose, the methyl cellulose being present in the admixture in amounts of from 0.5 to 33 percent by weight based upon the weight of the lignin.

2. A pharmaceutical composition for oral administration for reducing levels of cholesterol in the blood of humans suffering from hyperlipidemia which comprises as the active ingredient lignin, said lignin being admixed with methyl cellulose in amounts of from 0.5 to 33 percent by weight based upon the weight of the lignin.

References Cited

Chemical Abstracts, vol. 22, item 3908[2], 1928.
Chemical Abstracts, vol. 52, item 7464[1]–7465[a], 1958.
Nature, vol. 183, pp. 1119–20, April 1959.
Circulation, "American Soc. for the Study of Arteriosclerosis," vol. 20, p. 986, 1959.
Kirk-Othmer Encyclopedia of Chemical Technology, vol. 12, pp. 376–77, 1967.

JEROME D. GOLDBERG, Primary Examiner